United States Patent
Burbank et al.

[15] 3,634,922
[45] Jan. 18, 1972

[54] APPARATUS AND METHOD FOR FORMING COIL FOR PLASTIC SLIDE FASTENER

[72] Inventors: John Emerson Burbank, Middlebury, Conn.; William Henry Lautenberger, Staten Island, N.Y.; Patrick John Fasciano, Jersey City, N.J.

[73] Assignee: Scovill Manufacturing Company, Waterbury, Conn.

[22] Filed: Aug. 26, 1970

[21] Appl. No.: 67,066

[52] U.S. Cl. ............................29/410, 18/1 Z, 29/207.5 R, 264/296
[51] Int. Cl. .............................B21f 45/18, B29d 5/00
[58] Field of Search............29/410, 408, 207.5 ST, 207.5 R; 18/12; 264/296

[56] References Cited

UNITED STATES PATENTS 3,137,036  6/1964  Bashover et al. ....................18/1 Z

*Primary Examiner*—Thomas H. Eager
*Attorney*—Dallett Hoopes

[57] ABSTRACT

In a zipper coil former employing a pair of comb members moving the coil along a mandrel, the idea is to indent the sides of the coil by engaging them with a thickened portion of the spine of the combs.

3 Claims, 9 Drawing Figures

PATENTED JAN 18 1972 3,634,922

APPARATUS AND METHOD FOR FORMING COIL FOR PLASTIC SLIDE FASTENER

This invention relates to an apparatus and method for forming coil for plastic slide fasteners. More specifically, this invention relates to an improvement on the invention disclosed in U.S. Pat. No. 3,137,036 which improvement involves indentation of the coil so that the coil may be particularly suitable for use in the production of so-called invisible slide fasteners.

In U.S. Pat. No. 3,137,036, now owned by our assignee, there is disclosed an apparatus and method for forming coil from straight plastic filament. The process and apparatus disclosed involve the winding of the coil on a relatively thin stiff mandrel and moving the individual coils along by a pair of cooperative oscillating toothed members. In the process, the teeth were appropriately spaced to define the pitch of the helix or coil windings and as the toothed members oscillated, the coils were moved from the teeth of one member to the other. One of the toothed members is moved longitudinally with respect to the other so as to step the coil along successive teeth of the other toothed member.

The apparatus and process described in the above-identified patent were remarkable advances in the slide fastener art, and have been found extremely effective in manufacture on a mass production scale of coil suitable for slide fasteners. While the apparatus and method of the earlier patent were marked advances over the art, the product therefrom has left something to be desired when used in the forming of invisible fasteners. Such fasteners, because the tapes of the respective intermeshing coils are doubled back, place unusual stress tending to shift the coil with respect to the tape and causing the stitching to pull and lose its grip on the coils. Under the present invention, therefore, there is provided apparatus and a method for improving the invention of the above-mentioned patent to produce a coil having indentations in its side.

Other objects and advantages will be apparent from an examination of the following specification including the drawings all of which disclose a nonlimiting example embodying the invention.

Figure 1:
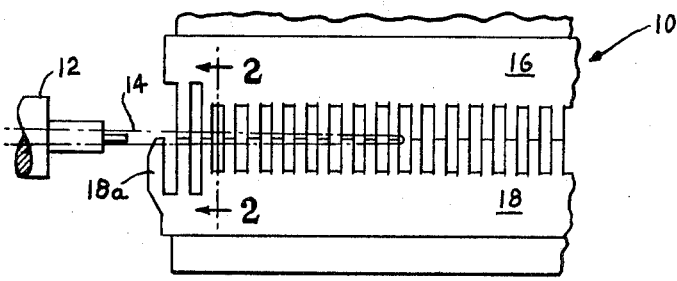
FIG. 1 is a front elevation of the mandrel with the mandrel partly in phantom and the combs showing the combs at midposition.

Referring more specifically to the drawings, an apparatus embodying the invention is generally designated 10 in FIG. 1. It comprises a feeding arbor 12 having a winding mandrel 14 extending outward from its axis. Mounted adjacent the mandrel 14 are a pair of combs or toothed members 16 and 18 which are mounted by means as shown and driven in a way described fully in the above-mentioned patent.

Figures 5, 6, 7:
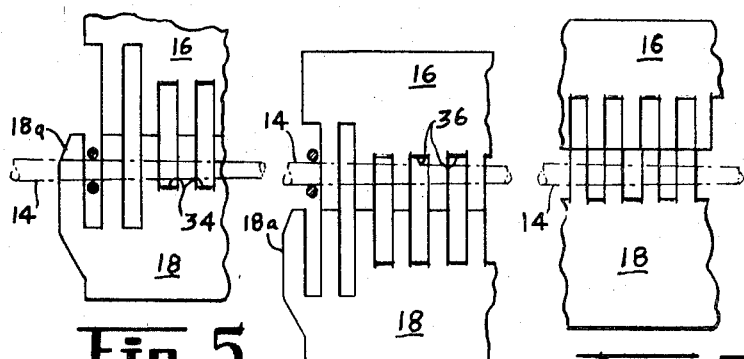
FIG. 5 is a fragmentary front elevation of the combs in the position shown in FIG. 3. The mandrel is shown in phantom.
FIG. 6 is a fragmentary front elevation of the combs in the position shown in FIG. 4.
FIG. 7 is a fragmentary front elevation of the combs and showing the lower comb in the middle of one of its lateral shifts.

Briefly, in accordance with that patent, the straight thermoplastic filament is fed through the arbor 12 and wound about the stationary mandrel 14. At each turn, the first tooth 18a of the comb engages the turn and moves the wound coil down the mandrel one pitch or tooth width. As it does this, comb 18 shifts laterally ahead rightward with respect to the upper comb 16. The combs 16 and 18 are then driven downward (FIG. 6) and place the turn in the first tooth of the upper comb. At the bottom of the stroke, comb 18 shifts laterally rearward (to the left) with respect to comb 16 so that on arising the next turn will come under the control of tooth 18a. The two turns are disposed respectively in the first two spaces between teeth and the comb 18. The combs then shift together downwardly so that the turns are shifted to the upper comb and comb 18 shifts laterally so that 18a then rising picks up the next turn, etc.

Figure 2:
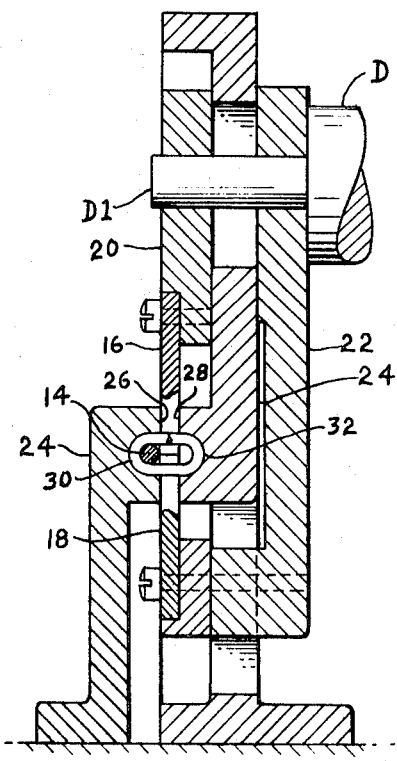
FIG. 2 is an enlarged view taken on the line 2—2 of FIG. 2 and showing the surrounding structure for driving the combs.

In the FIG. 2 sectional view, combs 16 and 18 are shown mounted on their respective drive plates 20 and 22. A supporting frame 24 appropriately mounts the drive plates for the desired movement. The rotating drive shaft D has an eccentric drive shaft D1 which drives comb 18 in an orbital path by means of drive plate 22. Comb 16 is driven in a lesser orbit because the hole in plate 20, which receives shaft D, is horizontally elongate, all as described in the patent.

As shown, the opposing faces 26, 28 of the frame 24 are grooved out as at 30 and 32 to support the oblong coil. As shown, the helix or coil rides on its mandrel 14 and, as shown, the grooves 30 and 32 in the support frame 24 support the coil on either side of the toothed members 16 and 18.

Figure 3:
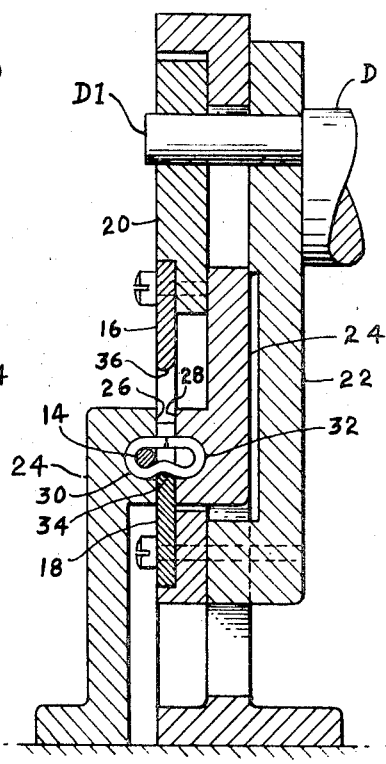
FIG. 3 is a view similar to FIG. 2 but showing the combs at the upper limit of travel.
Figure 4:
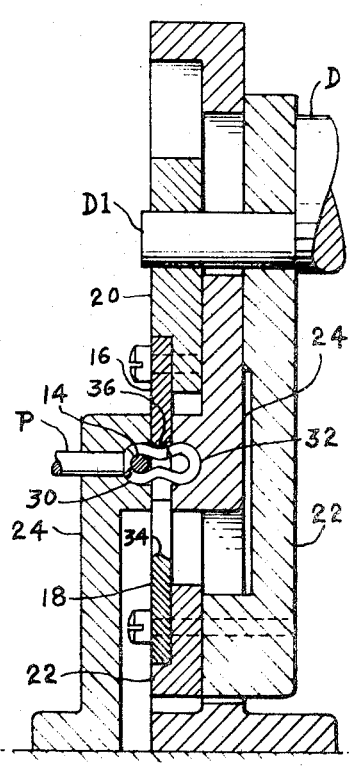
FIG. 4 is a view similar to FIG. 2 but showing the combs at the lower limit of their travel.

FIG. 2 shows the two toothed members in midposition, that is, with the distal ends of each tooth adjacent the mandrel 14. In FIG. 3, the two toothed members 16 and 18 are in their uppermost position and it will be noted that the spine 34 of the lower comb 18 has engaged the central portion of the coil C forming an indentation therein. On the following downward stroke, FIG. 4, the spine 36 of the upper comb 16 engages the upper run of the coil C indenting it in similar fashion. A punch P may form a head on the coil element as shown.

Figure 9:
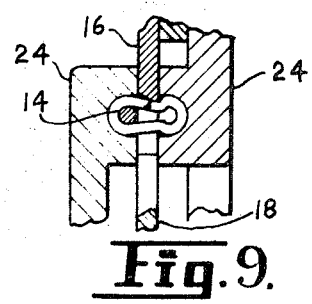
FIG. 9 is similar to FIG. 4 and shows a modified form of comb spine.

As shown, it is preferable that the engaging surfaces of spine 34 and 36 respectively be pointed adjacent its edge closest to the mandrel to form rather abrupt angular indentations adjacent that part of the coil. Alternatively, as shown in FIG. 9, the pointed edge may be more remote from the mandrel to produce the angular indentation adjacent the other end of the coil.

As shown in FIG. 1, preferably the engagement portion of the spine, or the indentations forming portion of the spine which is defined by the portions having the shorter teeth and the enlarged spine, is not commenced at the extreme end of the toothed members but instead some longer teeth are provided during the initial engagement of the coil with the toothed members. This assures that the coil is in proper position on the mandrel before indentation is started.

Figure 8:
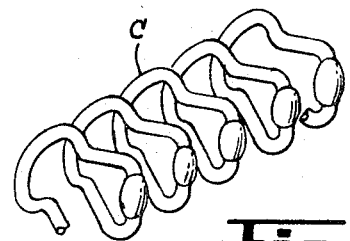
FIG. 8 is a perspective of the product made in accordance with the invention.

It should be noted that each turn of coil is struck repeatedly in the indentation area by the spine between each tooth after the first couple of teeth. This assures that the indentation will not have a tendency to "bounce back" out of the coil as the coil is moved down the mandrel. The product is shown in FIG. 8.

The invention may be covered in the following claim language:

We claim:

1. A method of making a slide fastener which comprises winding a filament about a mandrel to form a helix, engaging the individual windings of the formed helix between the successive teeth of two oppositely facing toothed members, the teeth of said members being spaced to define the pitch of the helix windings, and advancing the helix by transferring the helix windings in succession alternatingly from one toothed member to the other and by longitudinally moving one of the toothed members relatively to the other the distance of the pitch of a winding; and while supporting the helix on both sides of the toothed members, engaging a central portion of the helix with the spine of one of the toothed members to form an indentation in the side of the helix.

2. The method according to claim 1 wherein a central portion of the helix is engaged on opposite sides by both toothed members to form a helix product inwardly indented on both sides.

3. An apparatus for making a slide fastener comprising two oppositely facing movable toothed members, the teeth of said toothed members being spaced to define the pitch of the helix windings to be formed, a mandrel leading into said toothed members, means for winding a filament about the mandrel to form a helix, and means for advancing the helix comprising means for moving one of the toothed members longitudinally with reference to the other and said mandrel for receiving successive windings of the helix from the mandrel and advancing the helix the space of a tooth pitch and means for moving said toothed members in unison transversely relatively to said mandrel for transferring the helix windings in succession from one toothed member to the other; means for supporting the helix on both sides of the toothed members, the spine of one of the toothed members engaging the central portion of the helix and indenting same.

\* \* \* \* \*